United States Patent
Austen et al.

(10) Patent No.: US 8,626,973 B2
(45) Date of Patent: Jan. 7, 2014

(54) PSEUDO MULTI-MASTER I2C OPERATION IN A BLADE SERVER CHASSIS

(75) Inventors: Christopher H. Austen, Pflugerville, TX (US); Douglas M. Boecker, Rochester, MN (US); Joseph E. Bolan, Cary, NC (US); Patrick L. Caporale, Cary, NC (US); Brent W. Jacobs, Rochester, MN (US); Todd J. Rosedahl, Zumbrota, MN (US); Christopher L. Wood, Greenville, NC (US)

(73) Assignee: International Business Machines Corporation, Armonk, NY (US)

( * ) Notice: Subject to any disclaimer, the term of this patent is extended or adjusted under 35 U.S.C. 154(b) by 171 days.

(21) Appl. No.: 13/231,040

(22) Filed: Sep. 13, 2011

(65) Prior Publication Data

US 2013/0067134 A1 Mar. 14, 2013

(51) Int. Cl.
*G06F 13/00* (2006.01)

(52) U.S. Cl.
USPC .......................... 710/110; 710/305; 710/313

(58) Field of Classification Search
USPC ................................. 710/107, 110, 305, 313
See application file for complete search history.

(56) References Cited

U.S. PATENT DOCUMENTS

| | | | |
|---|---|---|---|
| 5,946,495 A | 8/1999 | Scholhamer et al. | |
| 6,430,636 B1 | 8/2002 | Cranston et al. | |
| 7,039,734 B2 | 5/2006 | Sun et al. | |
| 7,092,041 B2 * | 8/2006 | Lendaro | 348/705 |
| 7,127,638 B1 * | 10/2006 | Sardella et al. | 714/15 |
| 7,281,070 B2 | 10/2007 | Bomhoff et al. | |
| 7,502,896 B2 | 3/2009 | Isani et al. | |
| 2003/0158870 A1 * | 8/2003 | Goodman | 707/203 |
| 2003/0212847 A1 | 11/2003 | Bandholz et al. | |
| 2005/0002384 A1 * | 1/2005 | Larson et al. | 370/360 |
| 2007/0088874 A1 * | 4/2007 | Brabant | 710/62 |
| 2007/0124521 A1 | 5/2007 | Boecker et al. | |
| 2009/0031056 A1 * | 1/2009 | Bliss et al. | 710/31 |
| 2010/0150338 A1 * | 6/2010 | Nguyen | 379/412 |
| 2011/0138095 A1 | 6/2011 | Campbell et al. | |

OTHER PUBLICATIONS

IBM TDB, "Method to Provide Multi-master Support to the Primary Side of the IBM I2C MUX", ip.com PriorArtDatabase IPCOM000015036D, Publication date: May 8, 2002, 2 pages.
IBM TDB, "Method to Provide Exclusive Access to a Shared I2C Bus Resource (I2C MUTEX)" ip.com PriorArtDatabase IPCOM000015947D, Publication date: May 8, 2002, 3 pages.

* cited by examiner

*Primary Examiner* — Glenn A Auve
(74) *Attorney, Agent, or Firm* — Cynthia G. Seal; Jeffrey L. Streets

(57) ABSTRACT

A system and method are directed towards a pseudo multi-master operation on a serial bus. The pseudo multi-master operation allows multiple devices without standard multi-master functionality to operate on the serial bus as masters. In a disclosed example, the serial bus is an Inter-Integrated Circuit (I2C) bus, which is isolated when an adapter card requires access to the I2C bus, such as to update vital product data (VPD) to a memory device, and to cache the updated VPD to a chassis management module.

20 Claims, 5 Drawing Sheets

PSEUDO MULTI-MASTER I2C OPERATION IN A BLADE SERVER CHASSIS

BACKGROUND

1. Field of the Invention

The present invention relates generally to serial bus communication, and more particularly to enabling multi-master operation of serial bus devices in a blade server environment.

2. Background of the Related Art

In a computer system, a bus provides a communication pathway between hardware devices. A parallel bus is one category of computer system bus having multiple address and data signal lines for communicating multiple bits in parallel. The width of a parallel bus relates to the number of parallel lines in the bus and a corresponding number of bits that may be simultaneously communicated on the parallel bus. The rate of data transfer on a parallel bus for a given clock frequency is dependent on the bus width. Parallel buses are commonly used with certain, so-called "high speed" peripheral or memory devices. An example of a parallel bus is the Peripheral Component Interconnect (PCI) bus.

A serial bus, by contrast, sends data bits sequentially, i.e. one bit at a time. Serial communication typically involves differential signaling, wherein the magnitude of a dynamic voltage differential between a pair of conductors at a given clock cycle determines the bit value. A serial bus may be used, for example, to enable a system processor to communicate with an analog to digital converter which measures battery voltage. Despite the limitation of sequential bit transmission, a serial bus may operate at a high clock speed, which allows for very high data rates. A computer system may include one or more parallel bus and one or more serial bus, wherein each bus may be used for communication between a different subsystem of components.

Various bus standards have been created. Devices designed according to the same bus standard may communicate with one another using that bus standard. One well known serial bus standard is the Inter-Integrated Circuit bus (abbreviated "I2C"). I2C allows attached low-speed peripherals to communicate with a controller. Examples of low-speed hardware in a blade server environment that may operate on an I2C bus include temperature sensors, light-emitting diodes (LEDs), vital product data (VPD) storage devices, and general purpose input/output (GPIOs) pins on an integrated circuit. Any or all of these devices may be connected to a Service Processor or Management Controller (MC) to enable communication between the devices and the Service Processor or MC.

Bus mastering is a feature supported by many bus architectures that enables a device connected to the bus to initiate transactions over the bus. The controlling device is referred to as a "master device," and the controlled device is referred to as a "slave device." When controlling a slave device, the master device is said to "master" the bus. Slave devices are more passive than master devices. For example, a slave device may only communicate in response to a communication initiated by a master device. Only one device at a time can control communication over the bus. A slave may be a receive-only device, or it may respond to an inquiry from a master device. In either case, a master device provides and drives the clock signal used to synchronize the data line. The I2C bus comprises a serial clock line and a serial data line. To initiate a communication with a slave device on an I2C bus, a master drives the clock line and synchronously sends out a multi-bit address on the data line. Each slave device on the I2C bus is responsive to a specific address. When a slave detects its specific address, the slave device initiates a function.

Most modern bus architectures, including I2C, allow multiple devices to master a bus, in a process known as multi-mastering. The I2C protocol, for example, includes a multi-master suite of optional protocols and chips that allow a slave to be mastered by more than one MC. In a multi-master operation, the I2C standard includes an arbitration process to determine which master will gain control of the bus. Each device needs to be able to cooperate with the fact that another device is currently talking and the bus is therefore busy. Following the usual arbitration logic, if two devices start to communicate at the same time, the one writing more zeros to the bus (or the slower device) wins the arbitration and the other device immediately discontinues any operation on the bus. Also, each device must detect an ongoing bus communication and must not interrupt it. This is conventionally achieved by recognizing traffic and waiting for a stop condition to appear before starting to talk on the bus.

However, due to various design considerations, such as design and manufacturing costs, not all devices capable of mastering an I2C bus are designed to support the multi-master feature of I2C. In a blade server system, for example, the management controller (MC) and various I2C chips are commonly designed without multi-master capabilities. If a single-master and a multi-master device are both connected to an I2C bus, the single-master may attempt to communicate over the bus while the multi-master is already communicating over the bus. This simultaneous use of the bus can cause unpredictable results, such as data corruption. The same type of problem can occur between two single-master devices coupled to the same bus.

BRIEF SUMMARY

Systems and methods are disclosed for providing pseudo multi-mastering capabilities to an electronic system having component devices that lack standard multi-master functionality. According to an example method, a communication is requested from a first device to a second device over a serial bus in a computer system comprising a plurality of devices on the serial bus. The serial bus is isolated between the first device and the second device in response to the requested communication. The requested communication is performed over the serial bus between the first device and the second device. The serial bus is then de-isolated in response to completing the requested communication. The method may be applied, for example, to a multi-blade computer system, such as to isolate an I2C bus between an ASIC and a VPD chip while performing a VPD update, and then to isolate the I2C bus between the VPD chip and a blade management processor when caching the VPD from the blade management processor to a chassis management module.

A computer system is also disclosed that includes a multi-blade chassis configured for receiving a plurality of blade servers. At least one blade server is received within the chassis. The blade server includes a blade management processor. A chassis management module is also disposed in the multi-blade chassis, which is capable of managing each of the at least one blade servers. The chassis management module is in selective electronic communication with the blade management processor of the at least one blade server over an Inter-Integrated Circuit (I2C) bus. An adapter card on the blade server includes an application specific integrated circuit (ASIC) for controlling the adapter card and a writeable vital product data (VPD) chip containing information about the adapter card. Control circuitry is further provided for selectively isolating the I2C bus between the ASIC and the VPD chip, updating vital product information about the adapter card from the ASIC to the VPD chip while isolating the I2C bus, de-isolating the I2C bus, and caching the updated vital product data to the chassis management module.

DETAILED DESCRIPTION

The disclosed systems and methods are directed towards pseudo multi-master I2C operation. Specifically, the pseudo multi-master operation allows multiple devices to operate on the I2C bus as masters, when one or more of the devices lacks standard I2C multi-master functionality. The systems and methods are disclosed, by way of example, in the context of a blade server system having multiple blade servers and a shared management module within a blade chassis. However, the disclosed systems and methods may be used for imposing multi-master operation in any system having an I2C or other form of serial bus. In the disclosed example, an I2C bus is isolated when an adapter card requires access to the I2C bus. This isolation occurs in hardware to enable multiple devices to master the bus even though one or more of those multiple devices (i.e., the endpoints of the communication) are not capable of I2C multi-master operation.

Pseudo multi-master I2C bus access in accordance with the invention may be described, for example, in the context of caching the vital product data (VPD) of a device. Typically, the VPD of any component within a blade chassis environment is cached upon inserting the blade server into the chassis or powering up the system or blade server. According to the pseudo multi-master operation disclosed herein, an I2C bus is isolated when the adapter card requires access to the I2C bus, to protect against corruption of the VPD by stray I2C activity from another master. Then, a software handshake between the adapter card and the management processor on the blade server informs the management processor that a change to the VPD on the adapter card has occurred, so that the VPD may be cached or re-cached at the chassis management module. The software handshake indicates to the system that a change has occurred so that caching occurs when an adapter card requires access.

Figure 1:
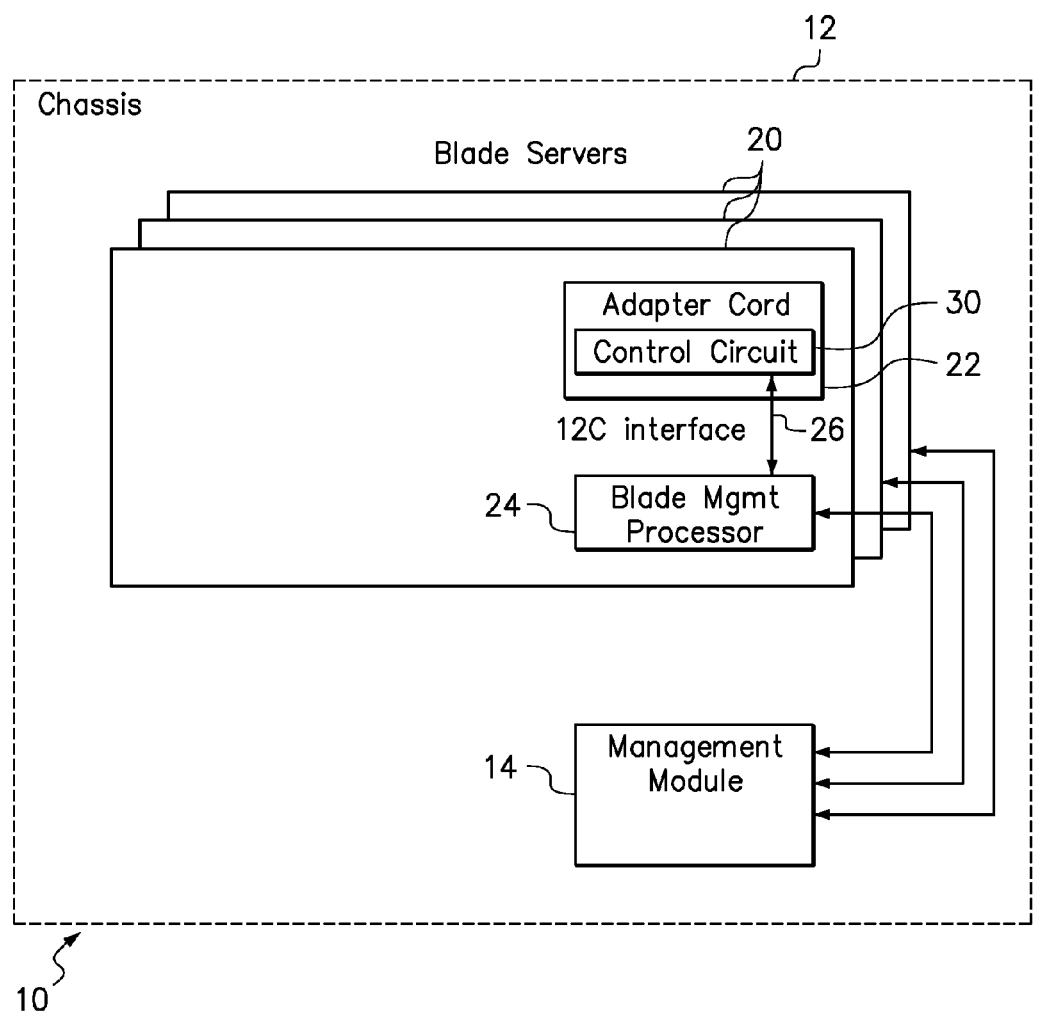
FIG. 1 is a schematic diagram of a blade server system on which I2C pseudo multi-mastering may be implemented.

FIG. 1 is a schematic diagram of a blade server system 10 on which I2C pseudo multi-mastering may be implemented, for devices lacking standard I2C multi-master capabilities. The blade server system 10 includes a multi-blade chassis 12 housing a plurality of blade servers 20. The multi-blade chassis 12 may be rack-mountable. A blade server is a server computer having a modular design optimized to minimize the use of physical space. Whereas a standard rack mount server can function with a power cord and network cable, blade servers save space and reduce power consumption by omitting certain components in favor of shared resources provided by the chassis 12. The shared resources may include power, airflow for cooling, and network connectivity, each of which may be provided by a corresponding support module (not shown). The blade servers 20 are managed by a shared chassis management module 14. The blade servers can communicate with the management module 14, such as through a chassis midplane (not shown) having connectors for individually connecting the blade servers 20. The shared resources provided by the support modules and management by a central chassis management module 14 allows the individual blade servers 20 and the overall chassis 12 receiving the blade servers 20 to provide a space-efficient design and maximize the computing capabilities within the space constraints of a data center.

Each blade server 20 includes a blade management processor 24, such as a baseboard management controller (BMC) or integrated management module (IMM). Each blade server 20 communicates with the management module 14 via the blade management processor 24. Each blade server 20 includes an adapter card 22. An adapter card, generally, is a device including a printed circuit board that connects to an expansion slot of a motherboard, to add additional functionality to the blade server. An adapter card will typically include either an edge connector or a mezzanine connector. An edge connector usually orients an adapter card perpendicular to the motherboard, whereas a mezzanine connector orients the adapter card 22 parallel to the motherboard. The adapter card 22 in this example is a mezzanine type adapter card, as the parallel orientation provided by the mezzanine connector helps to fit the adapter card 22 within the space constraints of the blade server 20. The type of connection between the adapter card and the blade server is generally not critical to the invention, however. The blade management processor 24 is in communication with the adapter card 22 via a serial bus, which in this example is specifically an I2C interface 26. The I2C interface 26 allows system devices to communicate according to the I2C protocol. Although the I2C bus standard includes a suite of available multi-master protocols and chips, the adapter card 22 and the management processor 24 are two devices that may not include standard I2C multi-master capabilities. If such a device were simply to disconnect from the I2C bus temporarily to allow another such device to access the I2C bus, data corruption may occur. The adapter card 22 includes additional control circuitry 30 that enables the pseudo multi-master operation. This pseudo multi-master operation may, for example, enable the adapter card 22 to perform local bus transactions, such as VPD reads and writes, while protecting against inadvertent VPD corruption. The control circuitry 30 may reside entirely on the adapter card 22, so that the invention may be implemented without any hardware upgrades to either the blade server 20 or the management module 14.

Figure 2:
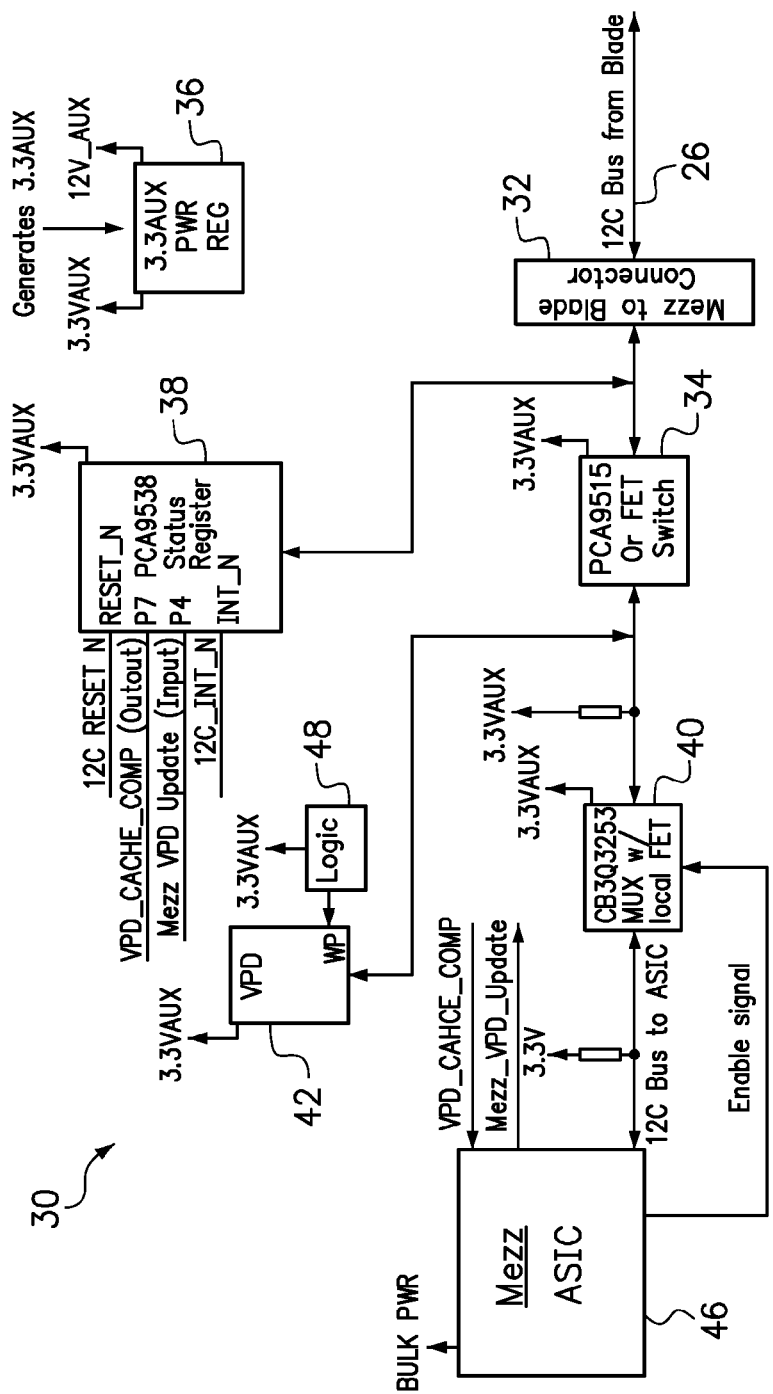
FIG. 2 is a schematic diagram detailing features of the control circuitry from the adapter card of FIG. 1.

FIG. 2 is a schematic diagram detailing features of the control circuitry 30 from the adapter card 22 of FIG. 1. Selected circuit elements included with the control circuitry 30 are individually labeled with their respective functions, in addition to reference numerals. As an overview, the circuit elements include: a mezzanine connector 32, a standard PCA9515 chip 34, an Auxiliary Power Regulator 36, a standard PCA9538 status register chip 38, a CB3Q3253 passive multiplexer (MUX) 40, a 512 k vital product data (VPD) storage chip 42, and an Application-Specific Integrated Circuit (ASIC) 46. One or more additional ASICs may also be provided, but are not necessary. Some of these circuit elements are commonly available, such as the PCA9515 chip 34 and the PCA9538 chip 38. However, other circuit elements having similar functionality may be substituted in some cases. For example, the PCA9515 is a specialized chip comprising a BiCMOS (Bi-polar Complementary Metal Oxide Semiconductor) integrated circuit for an I2C-bus, which permits extension of the I2C-bus by buffering both the data (SDA) and the clock (SCL) lines; however, the PCA9515 chip may be substituted with another type of FET switch.

The VPD chip 42 is a storage device that contains vital product data, which includes information about the adapter card. The blade management processor and the chassis management module (FIG. 1) read the VPD from the VPD chip 42 to determine what type of device the adapter card is. The VPD chip 42 may occasionally be re-flashed, or otherwise updated, requiring an I2C transaction to update the VPD at the chassis management module. Control logic for implementing this functionality (embodying truth table 50 of FIG. 4, discussed below) is encapsulated within a "Logic" block 48 that is coupled to the write protect (WP) pin of the VPD chip 42 in FIG. 2. The Auxiliary Power Regulator 36 is used to provide auxiliary power to the VPD chip 42 by converting a typical 12V input power from the blade chassis to a 3.3V auxiliary power for I2C components. The PCA9515 chip 34 is normally enabled, and is disabled only when the adapter card needs to perform an I2C bus transaction, such as a VPD read/write. Specifically, the PCA9515 chip 34 is enabled when the blade server powergood signal is de-asserted. The CB3Q3253 MUX 40 is a standard I2C chip comprising a passive multiplexer (MUX). The MUX 40 permits selection of I2C busses, and must be arbitrated if there are other ASICs in addition to the ASIC 46. The MUX 40 is normally disabled, and is enabled only when the adapter card needs to perform an I2C bus transaction (e.g. VPD read/write). Specifically, the MUX 40 is disabled when the blade server powergood signal is de-asserted. The interaction of the various circuit elements of the control circuitry 30 will be further illustrated in connection with an exemplary I2C Access Sequence in FIG. 5.

Figure 3:
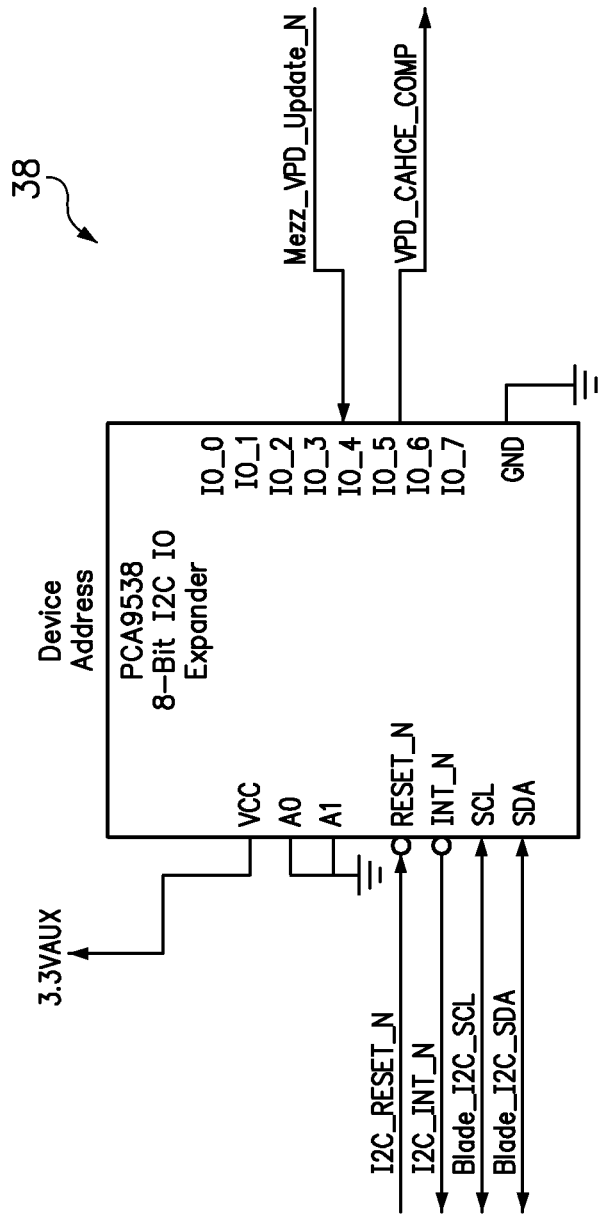
FIG. 3 is a circuit diagram of the PCA9538 chip of FIG. 2.

FIG. 3 is a circuit diagram of the PCA9538 chip 38, further detailing the PCA9538 chip, including selected inputs and outputs. The PCA 9538 chip 38 is the centralized component for implementing the handshake between the adapter card and the management processor on the blade server (see t3-t5 in FIG. 5) to inform the management processor that a change to the VPD on the adapter card has occurred. The PCA9538 chip 38 is a standard I2C, 16-pin CMOS device that provides 8 bits of General Purpose parallel Input/Output (GPIO) expansion with interrupt and reset for I2C-bus applications. The PCA9538 chip 38 includes an 8-bit Polarity Inversion register (active HIGH or active LOW operation). The system master can enable the I/O as either inputs or outputs by writing to the I/O configuration bits. Three key individual control lines that run through the PCA9538 are the Mezz_VPD_Update, VPD_Cache_Comp, and the I2C_INT_N (Interrupt) Signal. (Note, the prefix "MEZZ" in a signal name refers to the mezzanine-type adapter card controlling that signal.) A benefit of using the PCA9538 chip 38 is that only the I2C_INT_N interrupt line and the I2C SDA/SCL (serial data, clock) lines itself are passed between the mezzanine adapter card and the motherboard of the blade server, thus saving pins on the mezzanine connector 32 (FIG. 2). When the blade management controller receives an interrupt, it uses the I2C bus itself to read/write the bits of the PCA9538 chip 38. These control lines will be discussed further with reference to FIG. 5.

Figure 4:
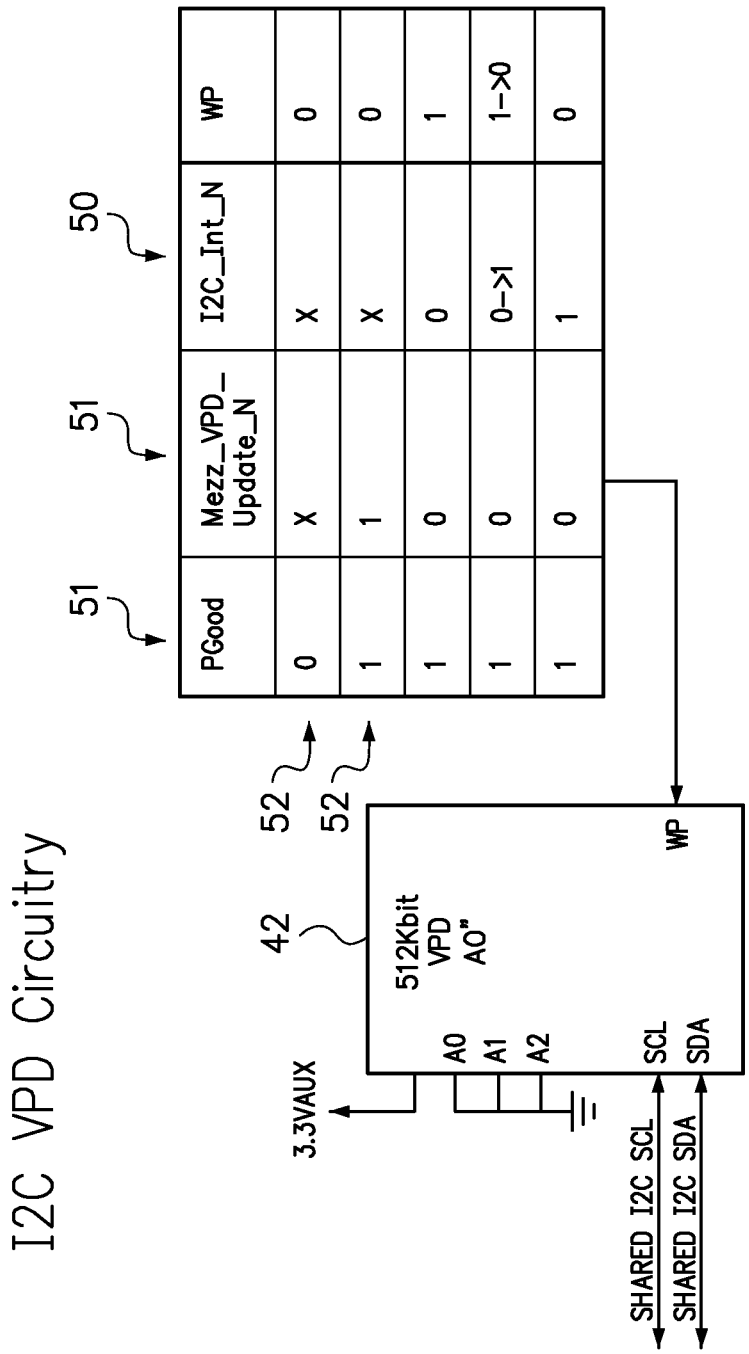
FIG. 4 is a circuit diagram further detailing the VPD chip of FIG. 2.

FIG. 4 is a circuit diagram further detailing the 512 kbit VPD chip 42. The shared I2C SCL refers to the shared serial clock line. The shared I2C SDA refers to the shared serial data line. SDA and SCL are open-drain (also known as open-collector), meaning that I2C master and slave devices can only drive these lines low or leave them open. FIG. 4 also includes a truth table 50 describes what happens in the circuit, which may be implemented at the discretion of a circuit designer without a hard requirement on a specific circuit. The truth table 50 may be implemented on the adapter card via hardware logic such as a combination of AND gates, OR gates, and so forth. Any number of different circuits could be created that perform the logic function specified in the truth table 50. This truth table 50 is encapsulated within the "Logic" block 48 that is attached to the write protect pin of the VPD chip 42 in FIG. 2. The truth table 50 has four columns 51 and five rows 52. Each column 51 of the truth table 50 is associated with a different signal: Pgood (powergood), Mezz_VPD_Update_N, I2C_Int_N (Interrupt), and WP (VPD Write Protect). Each row 52 of the truth table 50 lists a different set of values for each of the signals in the corresponding columns 51.

The first row sets forth that if the Power Good signal is 0 (i.e. the adapter card is currently running on auxiliary power and the ASIC 46 is not yet powered up), then the write protect (WP) bit should be a 0. The second row sets forth that if the Power Good signal instead is 1 (i.e. the adapter card is fully powered) and VPD_update is 1, then no update is pending, and the write protect bit should always be a 0. The last three rows in the truth table 50 of FIG. 4 correspond to t3-t5 in the timing diagram of FIG. 5. These last three rows indicate that the VPD chip is being re-attached to the blade server's I2C bus, at which point there is a need to write-protect the VPD chip to avoid any stray I2C transactions from the blade side causing memory errors in the VPD chip. The WP bit only needs to be on for a short amount of time until the interrupt signal is de-asserted. This is because the blade management controller is configured to read the PCA9538 chip (FIG. 3) once the interrupt is active to determine what changed. The interrupt automatically goes inactive by the PCA9538 chip in response to this read. At this point, the I2C bus is in a "normal" state again because a valid read has happened, and the WP bit may be de-asserted back to a 0. This part of the process ensures the volatile memory component is protected from being corrupted when the bus is re-attached.

Figure 5:
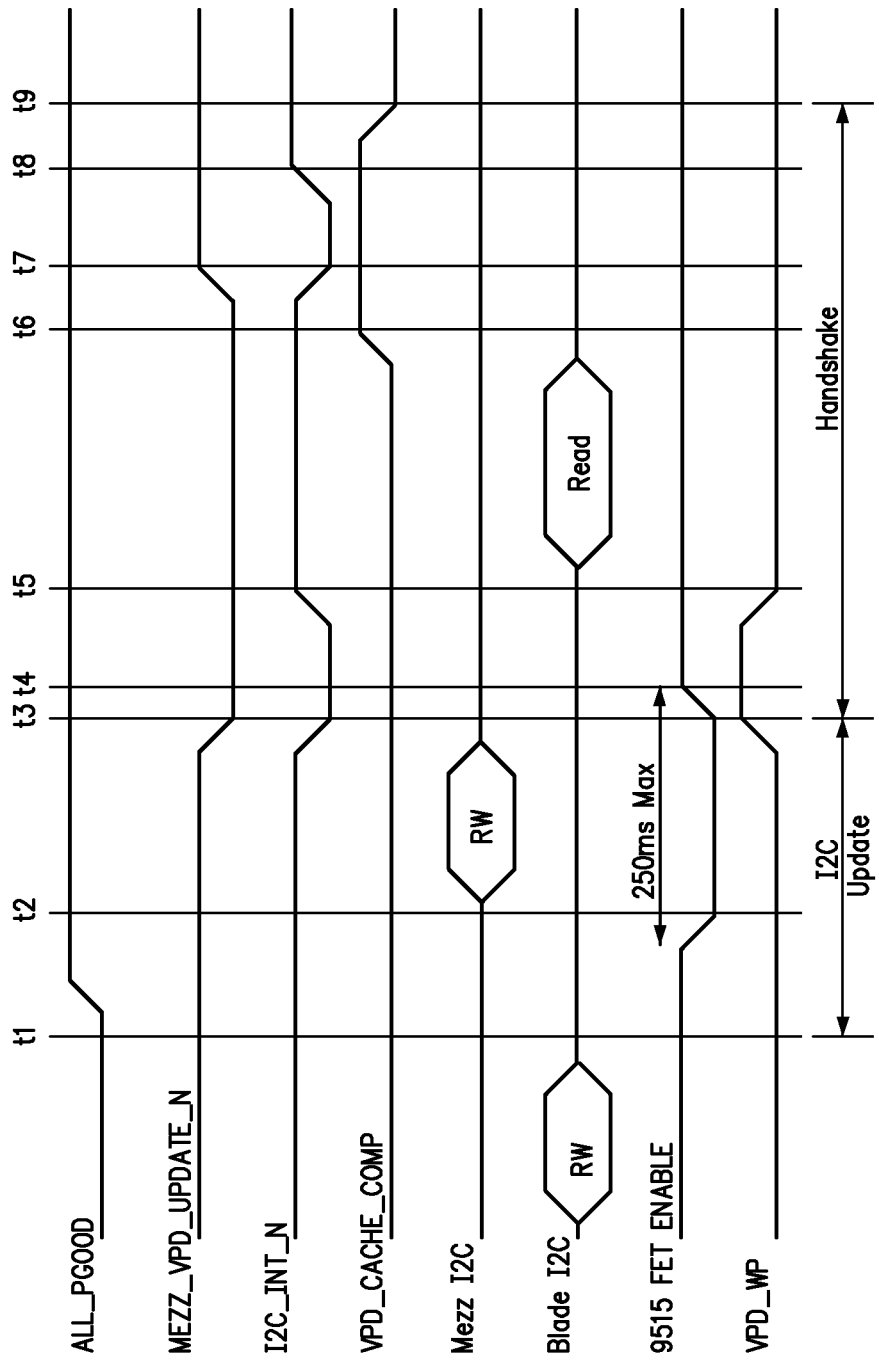
FIG. 5 is an I2C Access Sequence chart for the control circuitry of FIG. 1.

FIG. 5 is a timing chart outlining an I2C Access Sequence by which the control circuitry 30 of FIG. 1 operates to provide shared (i.e. pseudo multi-master) control of the I2C bus by the adapter card ASIC 46 and the blade management processor. Specifically, the timing chart shows how the ASIC 46 gains temporary control of the I2C bus to perform a protected VPD update to the VPD chip, such as following a firmware update at the ASIC. The timing diagram further shows how the control circuitry of FIG. 1 enables a handshake between the ASIC 46 and the blade management processor that gives control of the I2C bus back to the blade management processor, such as to re-cache the VPD at the chassis management module. The vertical grid lines of the timing chart represent points in time from t1 to t9, which may coincide with specific beats of a clock signal (but not necessarily consecutive clock signals). The generally horizontal lines represent the states of the signals used in negotiating control between the adapter card and management processor. Reference should be made also to FIG. 1 for the various circuit elements shown in FIG. 1.

The series of events spanning t1 to t3 encompass an I2C update of vital product data (VPD). Prior to t1, an auxiliary power state is entered when the signal ALL_PGOOD is de-asserted, which allows the management processor of the blade server to have full access (i.e. as master) to the I2C bus. At time t2, the signal ALL_PGOOD is asserted, as represented by the upward shift in the signal. The upward shift may represent the change in voltage from a lower value (0) to an upper value (1). Asserting ALL_PGOOD allows the adapter card to access the I2C bus. The adapter card disconnects the PCA9515 chip (FIG. 1) and enables a local FET provided by the CB3Q3253 MUX 40, to access the I2C bus. The FET functionality provided by the PCA9515 chip 34 and the local FET functionality of the CB3Q3253 chip 40 cooperate to provide, within the electronic realm, a sort of double protection analogous to a double door or airlock in a mechanical realm. Specifically, this double protection requires that for the adapter card to access the shared I2C segment where the VPD chip 42 resides, it must first disconnect the PCA9515, which takes the blade server's management processor off the I2C bus. Then, the adapter card attaches itself onto the shared I2C bus by enabling the local FET of the CB3Q3253 MUX chip 40. At that point, the ASIC 46 has access to the VPD chip 42 over the shared I2C bus. The adapter card (via the ASIC 46) then has the duration from t2 to t3 to perform I2C transactions, and specifically to access the VPD chip 42 to update the vital product data. That interval is 250 ms in this example. Between times t2 and t3, the adapter card completes the I2C transaction(s).

A handshake next occurs from t3 to t9 to inform the blade server's system management processor that a change has occurred, so that ultimately a VPD-caching operation can be performed at the chassis management module 14 (See FIG. 1). At t3, the adapter card has completed the transaction(s) and asserts MEZZ_VPD_UPDATE_N (b'0) prior to enabling the FET switch (PCA9515). Specifically, the mezzanine adapter card will assert that signal low when it has finished a VPD update. This signal is controlled by the ASIC 46, typically using a General Purpose Input/Output ("GPIO") pin. The PCA9538 chip 38 will then assert the signal I2C_INT_N, and VPD_WP (vital product data Write-Protect) is enabled. At time t4, the adapter card disables the local FET provided by the CB3Q3253 MUX chip 40 and re-enables the PCA9515 FET switch 34, which was previously temporarily disabled at time t2. Re-enabling the PCA9515 FET switch 34 restores full access by the blade server to the I2C bus. At time t5, an interrupt has been generated by I2C_INT_N, and write-protect on the VPD has been disabled by de-asserting the VPD_WP signal, to avoid VPD corruption that may otherwise be caused by any stray I2C transactions. In response to the interrupt, the blade's management processor reads the PCA9538 chip 38. The blade management processor detects that MEZZ_VPD_UPDATE_N is asserted, which indicates that the VPD has been updated. Accordingly, the blade server will then re-cache the now-updated VPD data. The VPD has been successfully re-cached in the chassis management module at time t6.

In response to completion of the VPD re-cache operation, the blade server asserts the VPD_CACHE_COMPLETE (b'1) signal. At time t7, the adapter detects the VPD_CACHE_COMPLETE signal assertion and, in response, de-asserts the MEZ_VPD_UPDATE_N (b'1). The PCA9538 chip 38 will generate an interrupt by asserting I2C_INT_N. At time t8, the blade management processor performs another read of the PCA9538 chip 38 in response to the I2C_INT_N, detects that the adapter card has now de-asserted the MEZ_VPD_UPDATE_N signal, and de-asserts the interrupt. At time t9, the blade server detects MEZZ_VPD_UPDATE_N has been de-asserted and, in response, the blade server de-asserts VPD_CACHE_COMPLETE (b'0). At the conclusion of these steps, a full cycle has been completed (t1 to t9). The adapter card can then reacquire the I2C bus if needed. However, the adapter card is prevented from accessing the I2C bus again until all the steps in the cycle from t1 to t9 have been completed.

The system and methods described above frame the invention in terms of just one example of a system wherein devices on an I2C bus may share control of the I2C bus, in the context of a blade server system. In the above example, an adapter card ASIC and a blade management processor share access to the I2C bus. One of ordinary skill in the art will appreciate that the inventive principles may be applied to any system wherein two or more components are provided with shared access to an I2C bus, even with only single-master capabilities. Thus, the scope of the invention recited in the accompanying claims is not to be limited to the environment of a blade server system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
    in a computer system comprising a plurality of devices on an Inter-Integrated Circuit ("I2C") serial bus, requesting communication from a first device to a second device over the serial bus, wherein one or both of the first and second devices lack standard I2C multi-master functionality;
    isolating the serial bus between the first device and the second device in response to the requested communication;
    performing the requested communication over the serial bus between the first device and the second device; and
    de-isolating the serial bus in response to completing the requested communication.

2. The method of claim 1, wherein the first device comprises an application-specific integrated circuit (ASIC) on an adapter card.

3. The method of claim 1, wherein the second device comprises a vital product data (VPD) storage chip, and wherein the requested communication comprises updating the vital product data to the VPD storage chip.

4. The method of claim 3, further comprising:
    de-asserting a write protect bit on the VPD storage chip while performing the VPD update; and
    re-asserting the write protect bit in response to completing the VPD update.

5. The method of claim 1, further comprising:
    in response to de-isolating the serial bus, isolating the serial bus between the second device and a third device on the serial bus; and
    performing another communication between the second and third devices while the serial bus is isolated between the second and third devices.

6. The method of claim 5, wherein the step of performing the requested communication over the serial bus between the first device and the second device comprises:
    updating VPD from an adapter card ASIC to a VPD chip.

7. The method of claim 6, further comprising:
    caching the updated VPD from the VPD chip to a chassis management module over the serial bus in response to de-isolating the serial bus.

8. The method of claim 1, wherein the step of isolating the serial bus between the first device and the second device comprises:
enabling a first circuit element between the first device and the second device to provide access to the serial bus by the first device only while the first circuit element is enabled; and
disabling a second circuit element to prevent access to the serial bus by a third device for as long as the second circuit element is disabled.

9. The method of claim 8, wherein the first circuit element comprises a local field effect transistor (FET) and the second circuit element comprises another FET.

10. The method of claim 1, further comprising:
isolating the I2C bus between the first and second devices in response to assertion of a blade server powergood signal.

11. A computer system, comprising:
a multi-blade chassis configured for receiving a plurality of blade servers;
at least one blade server received within the chassis, the blade server including a blade management processor;
a chassis management module disposed in the multi-blade chassis, the chassis management module in selective electronic communication with the blade management processor over an Inter-Integrated Circuit (I2C) bus;
an adapter card on the blade server, the adapter card including an application specific integrated circuit (ASIC) for controlling the adapter card, and a writeable vital product data (VPD) chip containing information about the adapter card; and
control circuitry for selectively isolating the I2C bus between the ASIC and the VPD chip, updating vital product information about the adapter card from the ASIC to the VPD chip while isolating the I2C bus, de-isolating the I2C bus, and caching the updated vital product data to the chassis management module.

12. The computer system of claim 11, wherein the control circuitry for selectively isolating the I2C bus between the ASIC and the VPD chip comprises:
a local FET disposed on the adapter card.

13. The computer system of claim 11, further comprising:
control circuitry for selectively isolating the I2C bus between the VPD chip and the chassis management module while caching the updated vital product data to the chassis management module.

14. The computer system of claim 13, wherein the control circuitry for selectively isolating the I2C bus between the VPD chip and the chassis management module further comprises a FET switch.

15. A computer program product including computer usable program code embodied on a non-transitory computer readable storage medium, the computer program product including:
computer usable program code for requesting communication from a first device to a second device over an Inter-Integrated Circuit ("I2C") serial bus, wherein one or both of the first and second devices lack standard I2C multi-master functionality;
computer usable program code for isolating the serial bus between the first device and the second device in response to the requested communication;
computer usable program code for performing the requested communication over the serial bus between the first device and the second device; and
computer usable program code for de-isolating the serial bus in response to completing the requested communication.

16. The computer program product of claim 15, wherein the second device comprises a vital product data (VPD) storage chip, and wherein the requested communication comprises updating the vital product data to the VPD storage chip, the computer program product further comprising:
de-asserting a write protect bit on the VPD storage chip while performing the VPD update; and
re-asserting the write protect bit in response to completing the VPD update.

17. The computer program product of claim 15, further comprising:
computer usable program code for isolating the serial bus between the second device and a third device on the serial bus in response to de-isolating the serial bus; and
computer usable program code for performing another communication between the second and third devices while the serial bus is isolated between the second and third devices.

18. The computer program product of claim 17, wherein the computer usable program code for performing the requested communication over the serial bus between the first device and the second device comprises:
computer usable program code for updating VPD from an adapter card ASIC to a VPD chip.

19. The computer program product of claim 18, further comprising:
computer usable program code for caching the updated VPD from the VPD chip to a chassis management module over the serial bus in response to de-isolating the serial bus.

20. The computer program product of claim 15, wherein the computer usable program code for isolating the serial bus between the first device and the second device comprises:
computer usable program code for enabling a first circuit element between the first device and the second device to provide access to the serial bus by the first device only while the first circuit element is enabled; and
computer usable program code for disabling a second circuit element to prevent access to the serial bus by a third device for as long as the second circuit element is disabled.

* * * * *